Patented Feb. 8, 1944

2,341,286

UNITED STATES PATENT OFFICE 2,341,286

MANUFACTURE OF CATALYSTS

Herman Pines and Richard C. Wackher, Chicago, Ill., assignors to Universal Oil Products Company, Chicago, Ill., a corporation of Delaware No Drawing. Application July 14, 1941, Serial No. 402,435

11 Claims. (Cl. 252—251)

This invention relates to a method of manufacturing catalysts useful in hydrocarbon conversion reactions such as for example cracking heavier portions of petroleum to produce gasoline, the reforming of low antiknock gasolines to increase their antiknock value, the isomerization of paraffin and/or naphthene hydrocarbons and miscellaneous types of condensation reactions such as for example polymerization of olefin hydrocarbons and the alkylation of aromatics, naphthenes, and isoparaffins with unsaturated hydrocarbons of different types.

The invention is more specifically concerned with the manufacture of modified types of metal halide catalysts for the above mentioned types of hydrocarbon conversion reactions. It has been recognized for some time that certain metal halides of the Friedel-Crafts type are highly efficient catalysts for accelerating the conversion rates among hydrocarbons. The halides of aluminum and particularly aluminum chloride and aluminum bromide are usually the most efficient members of the group although the chlorides of zirconium, zinc and iron, alone or in admixture with aluminum halides possess noteworthy activity. When employing these catalysts to accelerate hydrocarbon conversion rates it has been found practically essential if any proper rate of conversion is to be obtained to have present small but definitely essential amounts of hydrogen halides which may or may not be the true catalysts. At least substantially no catalytic effects are observable, for example, when aluminum chloride or aluminum bromide are utilized in a hydrocarbon reaction such as isomerization of normal paraffins to isoparaffins unless hydrogen chloride or hydrogen bromide are added or are generated by the action of incidentally or purposely added water which hydrolyzes a portion of the metal halides to produce the necessary hydrogen halide. In the last mentioned case it is obvious that the continued addition of water will eventually stop the activity of the metal halide catalyst since it will all be converted into a hydrate having substantially no activity. The need for adding hydrogen halide such as for example hydrogen chloride in hydrocarbon conversion reactions such as isomerization presents difficulties both from a practical standpoint and from a standpoint of cost, it being necessary to recover and recycle the hydrogen halide if the process is to be economical. The present process is concerned with the manufacture of hydrocarbon conversion catalysts which are active in the absence of hydrogen halide and possess other desirable characteristics.

In one specific embodiment the present invention comprises a process for the manufacture of hydrocarbon conversion catalyst which consists in subjecting a mixture of a saturated hydrocarbon and a metal halide to oxidation in the presence of light.

We have found that if a mixture of an aluminum halide such as for example aluminum chloride or aluminum bromide with either a paraffin or a naphthene hydrocarbon is subjected to oxidation under certain limited ranges of conditions that catalytic compounds are formed which have high catalytic activity in the absence of hydrogen halides. In general, the temperature at which the oxidation is conducted may vary from about —25° to about 150° C. lower temperatures being employed when the more active aluminum halides are employed such as aluminum bromide and higher temperatures being employed in the case of the slightly less active aluminum chloride and the considerably less active chlorides of zirconium, iron and zinc. Treatments are conducted at pressures of from substantially atmospheric to about 25 atmospheres and it has been found that the best catalyst complexes from the standpoint of activity are produced when not more than about 0.75 mol of oxygen are absorbed per mol of aluminum halide.

In manufacturing the catalysts in accordance with the present invention, the simplest procedure is to place regulated proportions of an aluminum halide and a saturated hydrocarbon in a pressure vessel which can be maintained at a definite temperature and which can be agitated to effect intimate contact of the aluminum halide and the hydrocarbon and then add air or oxygen or other oxygen-containing gas mixture under a slight superatmospheric pressure until the requisite amount of oxygen has been absorbed as indicated by a corresponding drop in pressure in the reactor. Following this step any hydrogen halide present may be removed by evacuation of the vessel under moderately increased temperature and the unreacted aluminum halide removed either by sublimation or by solvent extraction which latter process may be readily practiced in the case of catalysts manufactured from aluminum bromide which is quite soluble in low boiling saturated hydrocarbons.

The catalytic product is usually a relatively viscous material of a yellow to brown to black color depending upon the original halide used, the hydrocarbon employed and the extent of oxidation and possesses a relatively high activity in hydrocarbon conversion reactions. While some of the catalytic compounds produced are somewhat viscous at ordinary temperatures, their viscosity may be reduced considerably by heating to a moderately elevated temperature and they are readily emulsified with hydrocarbons to provide intimate catalytic contact. They may be used as such or they may be deposited upon relatively inert supporting or carrying materials such as for example the oxides of aluminum or magnesium or other refractory materials such as minerals of the kaolin group, montmorillonite or bentonite, either raw or acid-treated, charcoal, numerous types of naturally occurring silicates and silicas and artificially prepared siliceous materials consisting of silica alone or silica composited with various prepared oxides such as those of alumina, zirconia, thoria, etc. Acid treated montmorillonite or bentonite materials and synthetically prepared silica alumina and/or zirconium complexes are supports which are readily employed. The catalyst of the present invention may be placed on such supports by simple mechanical mixing or they may be prepared on supports in situ by first adding an aluminum halide to the support and then subjecting the composite material to oxidation in the presence of a hydrocarbon as described in connection with the manufacture of catalysts in the absence of supports. As a further feature the aluminum halide treated in accordance with the invention may be mixed with other relatively active or relatively inactive metal halides, with a purpose of further modifying the properties of the prepared catalyst. Thus aluminum halides may be treated in the mixture with the halides of zirconium, zinc or iron and also in admixture with halides and particularly the chlorides of the alkali and alkaline earth metals.

Catalysts prepared in accordance with the present process may be utilized on granular supports as already mentioned, the composites being employed as filler in reactors through which hydrocarbons are passed under regulated conditions of temperature, pressure and space velocity. They may be employed also in batch processes in which the catalysts are merely added to a pressure vessel which is corrosion resistant to which hydrocarbons are also added and in which reaction is brought about by heating the contents of the vessel at a fixed temperature and pressure.

The exact composition of the catalysts prepared in accordance with the present process is somewhat variable and the nature of the hydrocarbon radicals in combination with the metal halide radicals is difficult to determine. They apparently differ from previously known aluminum halide-hydrocarbon complexes in which apparently a radical $Al_2Cl_5$—is combined with an alkyl or an aryl radical and differ also from the aluminum mono alkyl or aryl dihalide compounds and the aluminum di-alkyl or aryl monohalide compounds since they contain some oxygen. Although their composition is not exactly known they always have definite catalytic activity when prepared in accordance with the process described.

The following example for the manufacture and use of a catalyst prepared in accordance with the present invention is given for illustrative purposes to indicate the practical aspects of the invention. However, the data are not introduced with the intent of unduly limiting the invention's proper scope.

In the manufacture of the catalyst a mixture of normal butane and aluminum bromide was treated with air at 20–25° C. during exposure to sunlight, after which the excess of aluminum bromide was leached out in solution in normal butane, and hydrogen bromide from the reaction was pumped off under mild evacuation. The conditions and quantities employed are tabulated below:

Reaction time _____ hrs __ 15
Temperature _____ degrees C __ 20–25
Normal butane charged _____ grams __ 13.84
Aluminum bromide charged _____ do ____ 5.54
Air _____ cubic centimeters __ 120

Under these conditions there was some incidental isomerization of the normal butane to isobutane.

The lower layer, consisting of addition complexes of aluminum bromide and probably oxidized products from the normal butane, was recovered and freed from aluminum bromide by extraction with further quantities of normal butane. This lower layer catalyst was then employed in the isomerization of further quantities of normal butane, the conditions of test and the results obtained being given in the table following:

Reaction times _____ hrs. in sunlight __ 15
Temperature _____ degrees C __ 20–25
n-Butane charged _____ grams __ 11.9
Lower layer catalyst charged _____ do ____ 0.7
Isobutane in liquid products
                               volume percent __ 17.5
Normal butane in liquid products __ do ____ 82.5

It will be seen from the above that the lower layer complexes had a very high catalytic activity since they were only used in an amount of about 6% by weight of the normal butane and there was produced a 17.5% yield of isobutane.

We claim as our invention:

1. A process for the manufacture of catalysts which comprises commingling a catalytically active metal halide with a saturated hydrocarbon, subjecting the resultant mixture to the action of an oxygen-containing gas at a temperature of from about −25° C. to about 150° C. and for a sufficient time to form an oxygen-containing hydrocarbon complex of the metal halide, and separating and recovering said complex.

2. The process as defined in claim 1 further characterized in that said hydrocarbon is a paraffin.

3. The process as defined in claim 1 further characterized in that said hydrocarbon is a naphthene.

4. A process for the manufacture of catalysts which comprises commingling a catalytically active aluminum halide with a saturated hydrocarbon, subjecting the resultant mixture to the action of an oxygen-containing gas at a temperature of from about −25° C. to about 150° C. and for a sufficient time to form an oxygen-containing hydrocarbon complex of the aluminum halide, and separating and recovering said complex.

5. A process for the manufacture of catalysts which comprises commingling a catalytically active aluminum halide with a saturated hydrocarbon, subjecting the resultant mixture to the action of an oxygen-containing gas at a temperature of from about −25° C. to about 150° C. and for a sufficient time to form an oxygen-containing hydrocarbon complex of the aluminum halide, separating said complex and depositing the same on a solid carrier material.

6. A process for the manufacture of catalysts which comprises depositing a catalytically active aluminum halide on a solid carrier material, commingling a saturated hydrocarbon with the thus supported halide, subjecting the resultant mixture to the action of an oxygen-containing gas at a temperature of from about −25° C. to about 150° C. and for a sufficient time to form an oxygen-containing hydrocarbon complex of the aluminum halide on said carrier material, and recovering the carrier material containing said complex.

7. The process as defined in claim 4 further characterized in that said hydrocarbon is a paraffin.

8. The process as defined in claim 4 further characterized in that said hydrocarbon is a naphthene.

9. The process as defined in claim 4 further characterized in that said halide is aluminum chloride.

10. The process as defined in claim 4 further characterized in that said halide is aluminum bromide.

11. The process as defined in claim 4 further characterized in that said time is such that there is absorbed not more than about 0.75 mol of oxygen per mol of aluminum halide.

HERMAN PINES.
RICHARD C. WACKHER.